April 5, 1960  J. W. WIESMANN  2,931,533
WIRE DISTRIBUTING APPARATUS
Filed Feb. 12, 1957  2 Sheets-Sheet 1
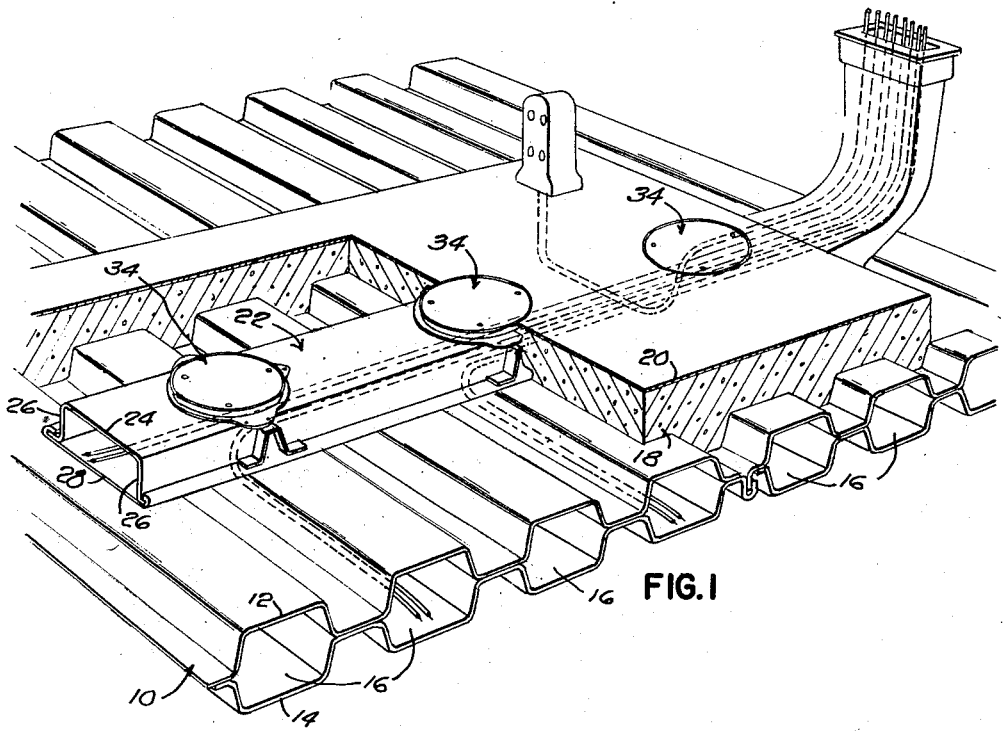
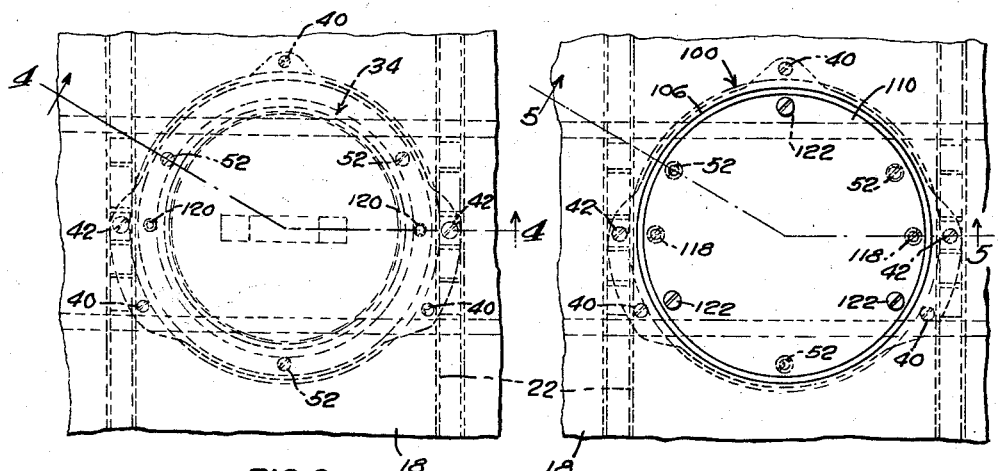
INVENTOR.
Joseph W. Wiesman
BY Robert R. Churchill
ATTORNEY April 5, 1960  J. W. WIESMANN  2,931,533
WIRE DISTRIBUTING APPARATUS Filed Feb. 12, 1957  2 Sheets-Sheet 2

INVENTOR.
Joseph W. Wiesman
BY Robert R. Churchill
ATTORNEY

United States Patent Office 2,931,533
Patented Apr. 5, 1960

2,931,533

WIRE DISTRIBUTING APPARATUS

Joseph W. Wiesmann, Pittsburgh, Pa., assignor to H. H. Robertson Company, Pittsburgh, Pa., a corporation of Pennsylvania Application February 12, 1957, Serial No. 639,738

1 Claim. (Cl. 220—3.4)

This invention relates to wire distributing apparatus.

The invention comprises an improvement in the wire distributing apparatus illustrated and described in my United States Patent No. 2,445,197, dated July 13, 1948, wherein a wiring duct is provided with a plurality of adjustable junction units cooperating with access openings in the duct for communication with the cells of a wire distributing floor.

The invention has for an object to provide a novel and improved auxiliary access fitting adapted to cooperate with such prior junction units to adapt the same for use when an initially installed junction unit is inadvertently covered over by the subsequently applied floor fill.

With this general object in view and such others as may hereinafter appear, the invention consists in the wire distributing apparatus hereinafter described and particularly defined in the claim at the end of this specification.

In the drawings illustrating the preferred embodiment of the invention:

Fig. 1 is a perspective view of a portion of a building showing a wiring duct provided with junction units, portions of the floor being shown in cross section;

Fig. 2 is a plan view of a junction unit connected to the wiring duct and which has been inadvertently covered over by the floor fill;

Fig. 3 is a similar view wherein the junction unit is shown as provided with an auxiliary access fitting after the fill above the junction unit has been broken away;

Figure 4:
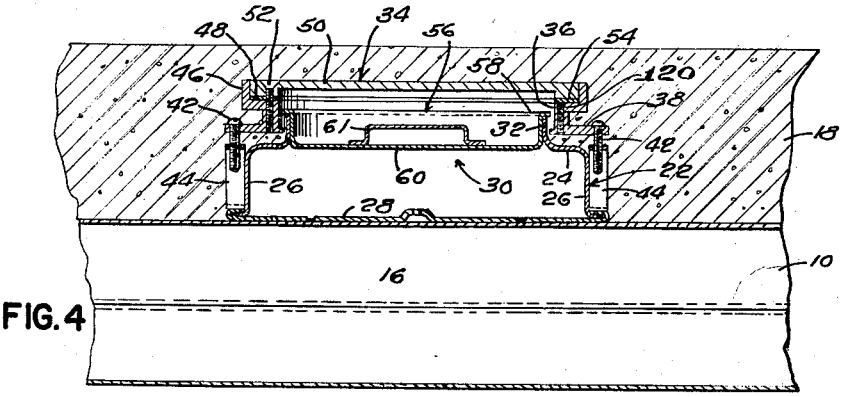
Fig. 4 is a cross sectional view taken on the line 4—4 of Fig. 2 showing a junction unit which has been entirely covered over with the floor fill.

In general the present invention relates to an improved crossover wiring duct embodying adjustable junction units of the general type shown in my Patent No. 2,445,197, above referred to, wherein each access opening in the duct is provided with a junction unit which includes an annular flanged member having a removable cover and adjustably secured to the top of the duct in operative relation to the access opening. In practice the junction units are initially adjusted to a predetermined height relative to the duct and the cellular metal floor, said predetermined height corresponding to the screed line of the subsequently poured floor fill. Under normal conditions where there is little or no deflection of the cellular metal floor, such as between relatively short spans, this procedure will dispose the tops of the junction units flush with the subsequently poured floor fill. However, when substantial deflection of the cellular metal occurs, such as at the central portion of a relatively long floor span, and the junction units have failed to be adjusted to compensate for such deflection, the depth of the floor fill at such central and adjacent portions of the cellular floor will be such as to completely cover the junction units. Accordingly, the present invention contemplates an auxiliary access fitting including an annular flanged member adapted to be connected to and form an extension of the initially installed annular flanged member after breaking away the hardened floor fill above the junction unit, provision being made for adjusting the height of the auxiliary annular flanged member to present the top thereof flush with the upper surface of the previously applied floor fill, the auxiliary access fitting being thereafter grouted into the floor fill.

Referring now to the drawings, 10 represents one type of cellular metal flooring used in the erection of buildings and which, as herein shown, comprises a plurality of units formed by assembling and uniting together an upper corrugated sheet 12 and a lower corrugated sheet 14 to form in effect a series of closely spaced parallel hollow beams or cells 16 upon the top of which a concrete fill 18 and finish flooring 20 is laid, as illustrated in Fig. 1. In practice it is preferred to manufacture the cellular metal floor in units of varying lengths according to the steel fabrication of the building in which the floor is to be incorporated, and during the erection of the floor the units are laid end to end so that the cells of one unit cooperate with and form extensions of the cells of a second unit to provide a plurality of continuous conduits extending across the building and through which wiring for electrical service of various types may be drawn.

As illustrated in detail in Figs. 2 and 4, the preferred form of the improved duct comprises an elongated, hollow, rectangular shaped conduit or duct 22 including an upper section having a top wall 24 and depending side walls 26 having their edges bent outwardly, and a lower section 28 comprising the bottom wall having its longitudinal marginal edges turned upwardly and inwardly to embrace the outwardly bent edges of the side walls 26, as shown in Fig. 4, in which condition the sections may be welded together to form an integral unit.

As herein shown, the top wall 24 is provided with a plurality of spaced junction units arranged in alignment with selected cells of the multicellular flooring, and each junction unit includes an access opening 30 which is defined by a cylindrical wall or tubular extension 32 upstanding from the wall 24 and about which an annular flanged member provided with a removable closure disk or member, indicated generally at 34, is adjustably mounted. Each annular member 34 comprises an intermediate annular section 36 having outwardly extended flange portions 38 at its lower edge provided with three radially arranged and equally spaced screws 40 threaded therein and which are arranged to engage the top wall 24 of the duct.

In operation by adjusting the screws 40 the annular member 34 may be raised or lowered and also positioned horizontally with relation to the duct 22. In order to secure the annular member 34 to the duct and to lock it in its adjusted position two diametrically opposed screws 42 are provided which pass through drilled holes in the flange portions 38 and cooperate with threaded openings in inverted V-shaped brackets 44 which, as herein shown, may be welded to the laterally extended marginal edges of the duct. In practice when assembling the duct in position on top and transversely of the multicellular flooring, the inverted V-shaped brackets 44, which define the center of a unit, may be used as centering guides to assist in aligning the center of a junction unit in alignment with the center of a cell.

As illustrated in Fig. 4, the upper portion of the section 36 of the annular member 34 is provided with an outwardly and upwardly extended flange 46 forming a recessed opening 48 in the top thereof arranged to receive a circular closure member 50 held in place by screws 52. A gasket 54 may and preferably will be placed in the recess beneath the closure member 50. The access opening 30 is provided with a cup-shaped closure 56 arranged to fit snugly within the circular wall 32. The cup-shaped closure may and preferably will be of substantially the same height as the wall 32, and as herein shown, is provided with a flange 58 at its upper end arranged to rest against the rim of the circular wall 32 to present the bottom 60 of the closure flush with the interior of the top wall 24 of the duct. Thus a flush continuous interior surface is provided at the access opening past which the wires leading to other junction units may be fished with minimum liability of fouling the fish tape. A handle 61 may be provided on the closure member 56 for convenience in removing and replacing the closure.

The description thus far defines substantially the structure of the prior junction unit described in my patent above referred to and which may be adjusted to present the top thereof in alignment with a nominal screed line which may vary in accordance with the deflection of the floor to an extent such that the entire junction unit is covered by the subsequently poured floor fill as shown in Fig. 4.

In accordance with the present invention when such a condition occurs the hardened floor fill above the junction unit may be broken away and removed to expose the top flange 46 of the annular member 34 and the closure member 50, whereupon the cover screws 52 may be removed and the closure member 50 removed and discarded. At this time the closure member 56 may also be removed and discarded. As herein shown, the auxiliary access fitting, indicated generally at 100 in Fig. 5, comprises a second annular member having a flange portion 102 provided with a tubular depending extension 104 along its inner edge and an upstanding tubular extension 106 along its outer edge forming a recessed portion 108 in the upper face of the annular member 100 arranged to receive a circular cover or removable closure disk 110. In order to adapt the second annular member 100 to the first annular member 34 the outside diameter of the flange 102 and extension 106 may be of a size such as to fit within and be vertically adjustable with relation to the recessed opening 48 which formerly received the discarded closure member 50, and vertical adjustment of the second annular member 100 may be effected by flat head screws which may comprise the screws 52 replaced in the member 34, the tops of the screws 52 now forming bearing points for supporting the member 100 in recessed portions 112 formed in the underside of the flange portion 102. Openings 114 above the recessed portions 112 and extended through the flange 102 provide access for a screw driver to permit vertical adjustment of the member 100 to present the top thereof level and in alignment with the top surface of the previously applied floor fill. It will be observed that the depending extension 104 in its lower position of adjustment is adapted to fit into the annular space 116 defined by the tubular extension 32 and the adjacent wall of the annular portion 36 of the first annular member 34 forming an extension of the initially installed member 34. In order to lock the second annular member 100 in its adjusted position a pair of screws 118 are extended through clearance openings in the flange portion 102 for cooperation with threaded openings 120 initially formed in the first annular member 34. The closure disk 110 may be removably secured in the recessed portion 108 by screws 122 extended into threaded openings in the flange portion 102 and located in spaced relation to the screws 52 and 118 as shown in Fig. 3. A gasket 124 may be provided between the closure disk 110 and the bottom of the recessed portion 108 as shown.

Figure 5:
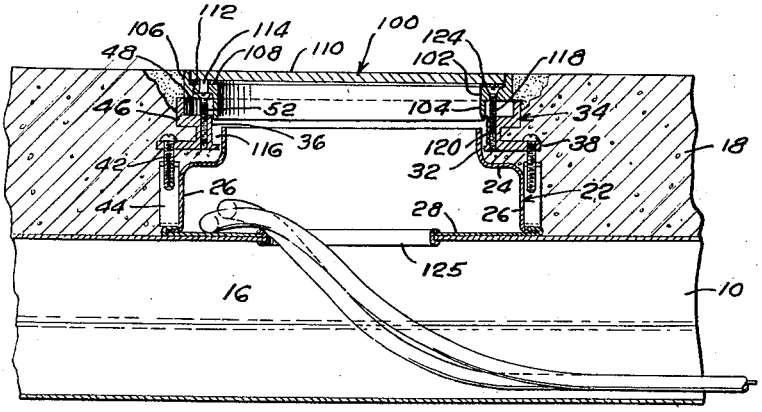
Fig. 5 is a cross sectional view taken on the line 5—5 of Fig. 3 and showing the auxiliary access fitting adjustably secured to the junction unit and grouted into the floor fill.
Figure 6:
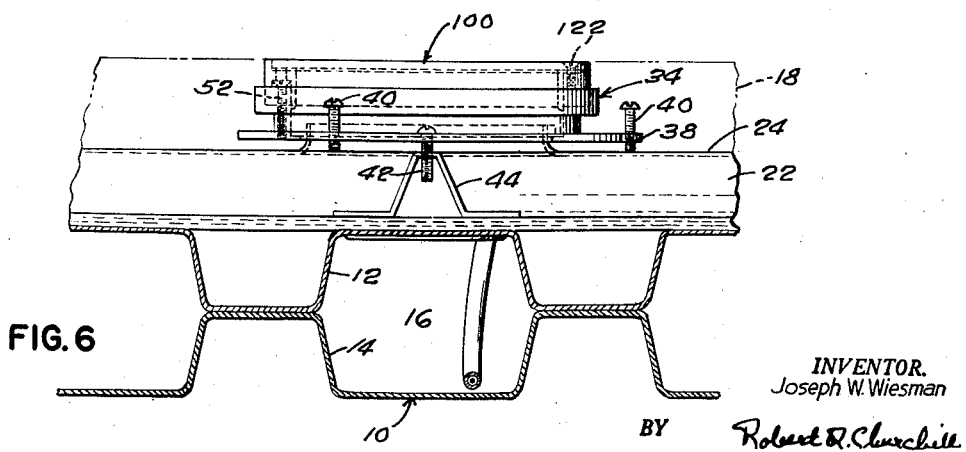
Fig. 6 is a side elevation of the junction unit shown in Fig. 5.

The assembled auxiliary access fitting comprising the second annular member 100 and closure disk 110 in its adjusted and locked position may then be grouted into the previously applied floor fill, as shown in Fig. 5. In order to make the access opening available for use, the closure disk 110 may be removed and the opening completed from the duct 22 into a cell positioned below, the opening being provided with a grommet 125, as shown, whereupon the closure disk 110 may be replaced.

From the above description it will be observed that the present auxiliary access fitting including the second annular member 100 and its closure disk 110 is adapted for cooperation with an initially overpoured annular member 34 upon removal of its closure disk 50 and may be easily and quickly assembled with the underlying previously installed annular member 34 upon breaking away of the floor fill thereabove and removal of the overpoured closure disk 50, thereby rendering the access opening readily available for use.

While the preferred embodiment of the invention has been herein illustrated and described, it will be understood that the invention may be embodied in other forms within the scope of the following claim.

Having thus described the invention, what is claimed is:

In a wire distributing cellular metal floor of the character described, a crossover duct comprising an elongated hollow member provided with an access opening in the top wall thereof defined by an upstanding tubular extension from said wall, a first annular member surrounding said tubular extension and arranged in fixed relation thereto, said first annular member having an inner wall portion, a laterally extended flange portion and an upstanding wall portion defining an annular recess in the upper end thereof, said inner wall portion defining with said tubular extension an annular space, and a second annular member having a depending inner wall portion, a laterally extended flange portion and an upstanding wall portion adapted to be received within and vertically adjusted relative to the annular recess of said first annular member, said depending inner wall portion of the second member being adapted to extend into said annular space and forming an extension of the inner wall of said first annular member, a set of screws threadedly engaged in said first annular member and upon the top of which said second member is supported and by which the height and level of the second member may be adjusted relative to the first annular member, and a second set of screws extended through openings in said second member and threadedly engaged with said first member to lock the second member in its adjusted position, said second member having openings therein to provide access for a screw driver to effect adjustment of said supporting screws, the upper end of said second member also defining an annular recess, and a closure member fitted into said recess and secured to said second member.

References Cited in the file of this patent
UNITED STATES PATENTS

| | | |
|---|---|---|
| 1,533,759 | Richardson et al. | Apr. 14, 1925 |
| 2,063,569 | Walker | Dec. 8, 1936 |
| 2,672,749 | Wiesmann | Mar. 23, 1954 |